United States Patent
Parry et al.

(10) Patent No.: US 11,652,619 B2
(45) Date of Patent: May 16, 2023

(54) SYSTEM AND METHOD FOR OPTIMIZING THE ROUTING OF QUANTUM KEY DISTRIBUTION (QKD) KEY MATERIAL IN A NETWORK

(71) Applicant: evolutionQ, Kitchener (CA)

(72) Inventors: Thomas Owen Parry, Cambridge (CA); James Andrew Godfrey, Waterloo (CA); Marco Piani, London (CA); Norbert Lütkenhaus, Kitchener (CA)

(73) Assignee: evolutionQ Inc., Waterloo (CA)

( * ) Notice: Subject to any disclaimer, the term of this patent is extended or adjusted under 35 U.S.C. 154(b) by 109 days.

(21) Appl. No.: 17/249,810

(22) Filed: Mar. 15, 2021

(65) Prior Publication Data

US 2022/0294616 A1  Sep. 15, 2022

(51) Int. Cl.
*H04L 9/08* (2006.01)
(52) U.S. Cl.
CPC .................. *H04L 9/0855* (2013.01)
(58) Field of Classification Search
CPC .................................................. H04L 9/0855
See application file for complete search history.

(56) References Cited

U.S. PATENT DOCUMENTS

| | | | | |
|---|---|---|---|---|
| 7,706,535 B1* | 4/2010 | Pearson | ................ | H04L 9/0855 380/255 |
| 10,348,493 B2* | 7/2019 | Fu | .......................... | H04L 9/0855 |
| 2002/0199108 A1* | 12/2002 | Chuang | ................ | H04L 9/0852 713/176 |
| 2010/0211787 A1* | 8/2010 | Bukshpun | ................ | H04L 9/14 380/255 |
| 2013/0251145 A1* | 9/2013 | Lowans | ................ | H04L 9/0891 380/44 |

(Continued)

FOREIGN PATENT DOCUMENTS

| | | | |
|---|---|---|---|
| JP | 2020501413 A | 1/2020 | |
| WO | WO-2019128753 A1 * | 7/2019 | ............... H04L 9/08 |

OTHER PUBLICATIONS

Tanizawa et al.; "A Routing Method Designed fora Quantum Key Distribution Network", 2016 IEEE, pp. 208-214. (Year: 2016).*

(Continued)

*Primary Examiner* — Matthew Smithers
(74) *Attorney, Agent, or Firm* — CPST Intellectual Property Inc.; Brett J. Slaney

(57) ABSTRACT

A system and method are described for proactively performing key swaps among nodes in a quantum key distribution (QKD) network. The method includes determining a routing solution for nodes in the QKD network; making the routing solution available to the nodes in the QKD network; and initiating key swaps among the nodes in the QKD network according to the routing solution, prior to key requests being made within the QKD network. The method can also include continuously performing key swaps among the nodes in the QKD network according to the routing solution; detecting a change in capacity and/or a change in demand on one or more links within the QKD network; determining a new routing solution based on the detected change; and continuously preforming subsequent key swaps according to the new routing solution.

25 Claims, 14 Drawing Sheets

(56) References Cited

U.S. PATENT DOCUMENTS

| | | | | |
|---|---|---|---|---|
| 2014/0143867 A1* | 5/2014 | Tanizawa | ............... | H04L 9/0855 726/22 |
| 2014/0181522 A1* | 6/2014 | Tanizawa | ............... | H04L 63/06 713/171 |
| 2015/0270963 A1* | 9/2015 | Tanizawa | ............... | H04L 9/0852 713/171 |
| 2021/0044432 A1* | 2/2021 | Li | ............... | H04L 9/0822 |

OTHER PUBLICATIONS

Chenhui Ma et al: "Hierarchical routing scheme on wide-area quantum key distribution network", 2016 2nd IEEE International Conference on Computerand Communications (ICCC), IEEE, Oct. 14, 2016 (Oct. 14, 2016), pp. 2009-2014.

Ya-Xing Wang et al: "Topological optimization of hybrid quantum key distribution networks", Arxiv.org, Aug. 20, 2020 (Aug. 20, 2020).

European Search Report issued in corresponding EP application No. 21165366.2; Search dated Sep. 10, 2021.

P. Tysowski, X. Ling, N. Lutkenhaus, M. Mosca; The Engineering of a Scalable Multi-Site Communications System Utilizing Quantum Key Distribution (QKD); arXiv:1712.02617.

* cited by examiner

```
* <pre>{@code
* e.g. Output: For local site identity = "0"
* demandNodePairRoutingSolutions: [
*   {
*     sourceNode = "0",
*     destinationNode = "3",
*     flowsSingleNodePair = [
*       {
*         path: [0-1-3],
*         amount: 1
*       },
*       {
*         path: [0-2-3],
*         amount: 5
*       }
*     ]
*   },
*   {
*     sourceNode = "1",
*     destinationNode = "2",
*     flowsSingleNodePair = [
*       {
*         path: [1-0-2],
*         amount: 2
*       },
*       {
*         path: [1-0-7-2],
*         amount: 6
*       }
*     ]
*   },
*   {
*     sourceNode = "1",
*     destinationNode = "4",
*     flowsSingleNodePair = [
*       {
*         path: [1-0-2-4],
*         amount: 3
*       },
*       {
*         path: [1-0-7-2-4],
*         amount: 7
*       }
*     ]
*   }
* ]
* }</pre>
```

FIG. 11

SYSTEM AND METHOD FOR OPTIMIZING THE ROUTING OF QUANTUM KEY DISTRIBUTION (QKD) KEY MATERIAL IN A NETWORK

TECHNICAL FIELD

The following generally relates to quantum key distribution (QKD) and more specifically to optimizing the routing of QKD key material in a network through pre-allocation.

BACKGROUND

Secure network communication is an important objective in an information technology (IT) infrastructure. In particular, secure inter-domain communication is important to larger organizations that are distributed across multiple geographical sites. Computing hosts on a local site regularly establish communication sessions with arbitrary computing hosts of a remote site. The key management service (KMS) of an IT security system typically provides a data encryption service on top of a standard network protocol. Although there are many commercially available cryptosystems in use today, the majority of them rely upon key exchange under public key cryptography where the computational problem is infeasible to break using current computing technology. However, rapid advances are occurring in the field of quantum computing. Once a quantum computer is built to solve problems of a practical scale, currently-deployed conventional public key cryptography is felt to be critically vulnerable to attack, and a new way of protecting transactions over a network will be needed.

To mitigate the risk of successful attack, QKD has been devised, which is based on the laws of quantum physics and is a theoretically secure form of generating keys that is resistant to attacks by both conventional and quantum computers. QKD allows two parties to produce a random shared secret known only to them—a key that can be used to secure other forms of communication. QKD devices connect parties in pairs to allow them to establish a source of random shared secret material. The rates these devices can produce random shared secret material is lower than available to data networks. QKD rates also scale inversely with the distance between QKD device pairs.

Ref [1] (P. Tysowski, X. Ling, N. Lutkenhaus, M. Mosca; "*The Engineering of a Scalable Multi-Site Communications System Utilizing Quantum Key Distribution (QKD)*; arXiv: 1712.02617) proposes a multi-site secure communications network 8. The network model being addressed, as shown in FIG. 1, is assumed to include multiple sites 10 that are geographically separated, such as buildings in a metropolitan area. Each site can be a physically secure domain that contains a Local Area Network (LAN) having potentially thousands of heterogeneous hosts, or computing devices attached to the network, including desktop and mobile devices. Sites may be connected by fiber optic channels with user data multiplexed through Wavelength-Division Multiplexing (WDM), and these are considered conventional traffic channels. The fiber is typically shared as opposed to being dark. LANs are connected to switches, and in turn, to Wavelength Division Multiplexers (WDMs). The fiber channels can be exploited to carry both secure user traffic as well as to perform QKD thus, they form a quantum network with quantum links 28 between each pair of communicating sites. However, the links 28 between sites may not necessarily utilize fiber. The sites may alternatively be connected by any other channel enabling both quantum and classical communication, notably such as a free-space optical channel. The proposed architecture supports any such link 28.

The network model in FIG. 1 includes multiple communicating sites 10, each containing hosts that request session keys from their local KMS 12. Each KMS 12 maintains a quantum key pool that contains QKD-generated key material. QKD is executed over a quantum network 8 of such sites 10. Once hosts obtain session keys to encrypt individual communication sessions, they can engage in secure communication across sites over a conventional network connection, which may exhibit a different topology A fundamental difficulty is that the QKD protocol is designed to work for two parties only. However, in a metropolitan network, quantum-safe communication should be permitted between any arbitrary hosts on any arbitrary sites; a flexible addressing mechanism and scalability are therefore required.

Additional challenges are the distances involved; sites may be separated by tens of kilometers, limiting the key generation rate. A metropolitan network may include tens of sites, and each site may contain thousands of hosts, so that there is great contention for quantum key material. Additionally, sites may not be fully mesh-connected by quantum links 28, so that relaying of quantum key material to remote sites is required. Finally, dedicated quantum links 28 through dark fiber for QKD may not be available or cost effective so that existing fiber optic lines for client traffic may need to be utilized for QKD. Each node in the network may have dual roles; it may act as an end-point for a connection or as a relay for the QKD key generation process, or both.

The host of each site 10 retrieves a session key from the locally-hosted KMS 12. This key encrypts a single communication session between any two hosts located on separate sites. The same pair of users can engage in multiple secure sessions such as chat, file transfer and videoconferencing, each requiring its own session key. This approach minimizes the impact of a single key compromise and permits different algorithms and key types to be used for different applications as appropriate.

Each KMS 12 maintains a key repository, called a quantum key pool, that contains key material generated through QKD, sometimes referred to as QKD-generated key material or quantum key material. Once hosts obtain session keys to encrypt individual communication sessions, they can engage in secure communications across sites 10 over a conventional network connection, including a wireless broadband network, copper cable network, or long-haul optical fiber. The conventional network may have a different topology than that of the quantum network and may include the use of routers and switches.

A pairwise link 28 between two sites 10 is illustrated in FIG. 2. A QKD network 8 can be formed by connecting a set of these pairwise QKD links 28 into a larger graph as shown in FIG. 3, which includes a number of nodes (i.e. sites 10) connected to a hub 11. Such a network 8 can connect across a larger distance than any individual link 28 while allowing broader communication without requiring an individual connection per site 10. Through a process called 'key relay', also referred to as 'key swap', random shared secret material can be securely transferred through a QKD network 8 between non-adjacent nodes. Random shared secret material is processed into a key by dividing it into pieces of a specified length and assigning it a unique shared identifier. The key relay operation takes a key for an adjacent node pair and securely sends it to a non-adjacent node, so the nodes now share the same key. The secure transfer consumes QKD keys along the path to encrypt the key value being relayed.

While the topology in FIG. 1 can be used to provide a quantum-safe multi-site secure communications network 8, complexities in key relaying that may be introduced as QKD networks 8 become more complex can increase. There is a need to address these complexities to avoid inefficiencies and failures in the network 8.

SUMMARY

In one aspect, there is provided a method of proactively performing key swaps among nodes in a quantum key distribution (QKD) network, the method comprising: determining a routing solution for nodes in the QKD network; making the routing solution available to the nodes in the QKD network; and initiating key swaps among the nodes in the QKD network according to the routing solution, prior to key requests being made within the QKD network.

In another aspect, there is provided a non-transitory computer readable medium comprising computer executable instructions for proactively performing key swaps among nodes in a quantum key distribution (QKD) network, comprising instructions for: determining a routing solution for nodes in the QKD network; making the routing solution available to the nodes in the QKD network; and initiating key swaps among the nodes in the QKD network according to the routing solution, prior to key requests being made within the QKD network.

In yet another aspect, there is provided a system for proactively performing key swaps among nodes in a quantum key distribution (QKD) network, the system comprising a processor and memory, the memory storing computer executable instructions that when executed by the process cause the system to: determine a routing solution for nodes in the QKD network; make the routing solution available to the nodes in the QKD network; and initiate key swaps among the nodes in the QKD network according to the routing solution, prior to key requests being made within the QKD network.

BRIEF DESCRIPTION OF THE DRAWINGS

Embodiments will now be described with reference to the appended drawings wherein:

FIG. 11 provides example computer-executable code for implementing a routing solution.

DETAILED DESCRIPTION

The following describes a system for proactively performing key swaps among nodes in a QKD network that is configured to determine a routing solution for nodes in the QKD network, make the routing solution available to the nodes in the QKD network, and initiate key swaps among the nodes in the QKD network according to the routing solution, prior to key requests being made within the QKD network. This can be done continuously until a new routing solution is needed. The routing solution can take capacity and demand information and direct key relay operations in the QKD network. The routing solution can account for competing requests to efficiently transfer keys within the network, avoiding oversaturating links by considering multiple paths in advance.

QKD Architecture

Figure 4:
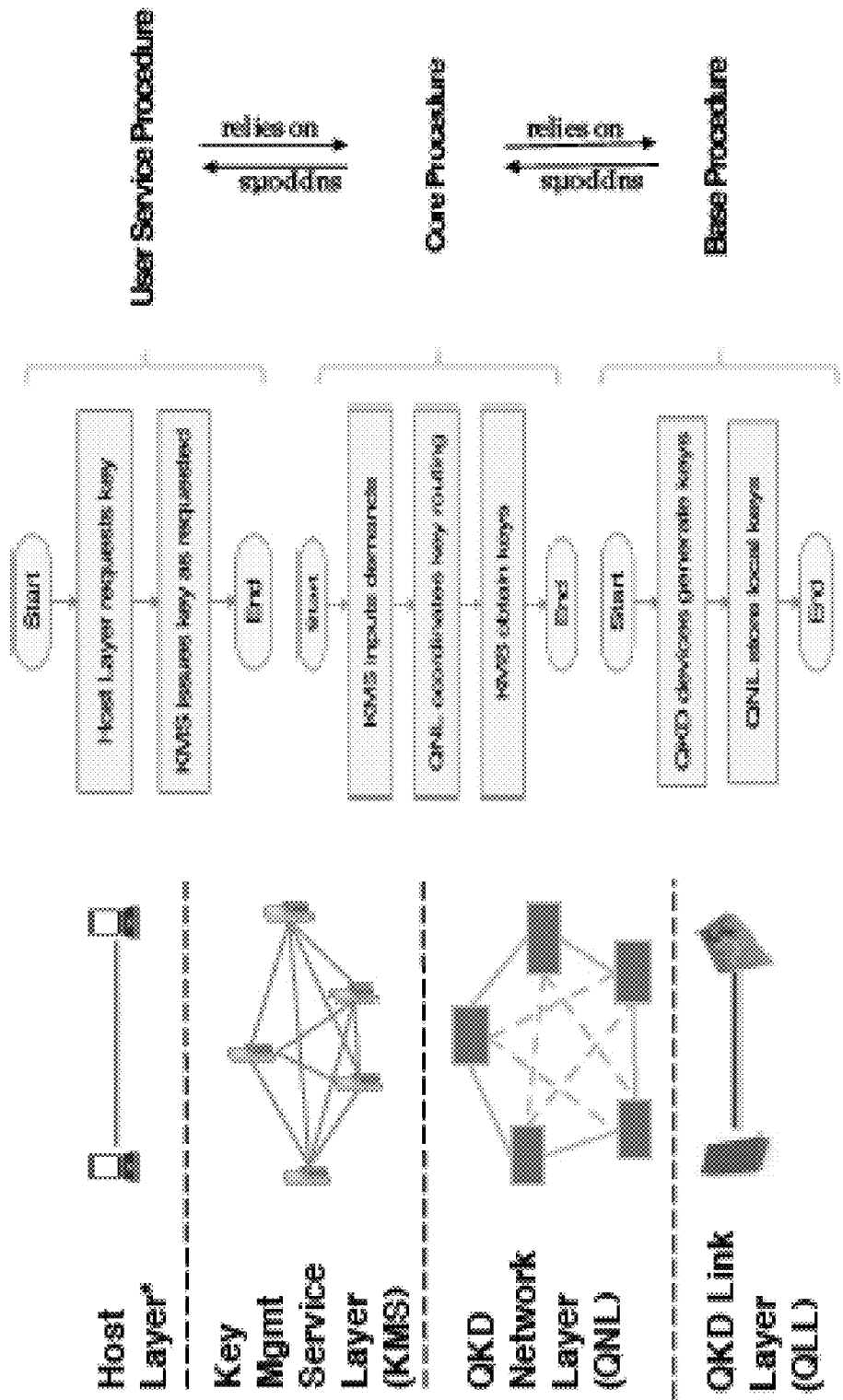
FIG. 4 is a schematic diagram of a QKD network stack.

The system proposed in Ref [1] is configured in a layered architecture style, as shown in FIG. 4. In such a configuration, various high-level procedures are continuously running across the stack. In the User Service Procedure, a host inside the Host Layer requests and is issued keys from the key pool within the KMS Layer. In the Core Procedure, the KMS layer in turn reports the demand for keys to the QKD Network Layer (QNL), which finds capacity in the quantum network to perform the key generation and determines how the key generation data flows are to be routed through the trusted nodes. In the Base Procedure, the QNL then issues instructions to the Quantum Link Layer (QLL) to generate raw key bits along each route by employing QKD devices. These key bits are then passed up to the QNL, assembled as a key bit stream, shared by the endpoints, and then passed up to a key pool in the KMS 12, which is a pool of buffered, persisted key material between two nodes in the system. There is a clear dependency between each pair of layers that is implemented by an interface contract.

This software engineering model ensures that the major functions are grouped separately with well-defined interfaces across the layers that can be standardized. Traversing the protocol stack in the bottom-up direction, the QLL produces raw key material by employing QKD hardware across a quantum link between two sites, based on instructions received from the QNL above. The QNL issues key generation and routing requests for raw key material to be produced through a network of trusted nodes and assembles and provides it to the KMS Layer above to fill its key pool. The KMS 12 responds to key requests from the Host Layer above by issuing keys from its pool of QKD-generated key material that it manages, in accordance with a configured security policy. The Host Layer at the top encapsulates the software applications running on host hardware within a site, such as desktops and mobile devices, that require secure communication with other hosts. These applications request session keys, either through a proprietary or standard protocol.

The system optimizes key generation through a network of sites in which the majority would be expected to function as trusted nodes. These are sites which volunteer to act as intermediaries for other sites that do not share a direct quantum link over which key generation through QKD could occur. A trusted node facilitates the secure and authenticated exchange of key material between non-adjacent nodes. The trusted node used QKD to generate shared secret keys with neighboring nodes to allow it to transfer key material through the network to its eventual destination. A chain of trusted nodes can be built to cover larger geographical distances. Because each trusted node unavoidably knows the keys that it creates, in current implementations, it needs to be fully trusted by the endpoints.

The layered architecture results in a technology-independent design that can accommodate any QKD technology with minimal changes. Replacing fiber link QKD with free-space QKD, for example, can occur just by modifying or replacing the lowermost link layer that communicates directly with the QKD devices. One can even design the option to use QKD in host applications irrespective of the current availability of QKD. This design choice can be made at the same time as post-quantum alternatives are designed into those applications. An implementation-level security policy can dictate which available technology to use to satisfy business needs. Application hosts can be made to choose an appropriate security protocol such as SSL or IPSec based on engineering considerations, issues such as compatibility, ease of configuration support for data compression, interoperability, and transfer speed. Irrespective of the protocol chosen, QKD will generate quantum key material at a lower layer for its use.

Figure 5:
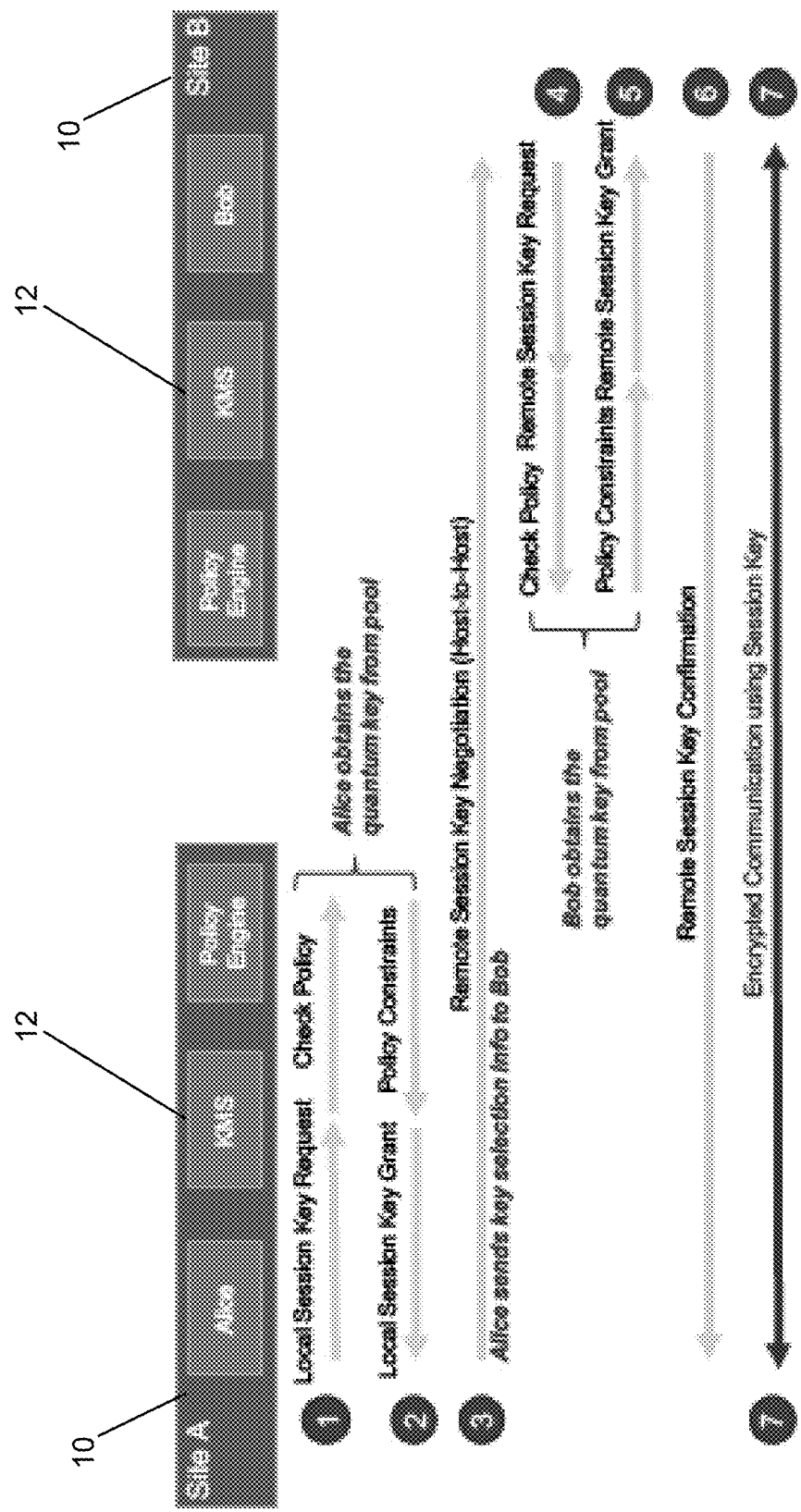
FIG. 5 illustrates a session key negotiation for a quantum key.

The KMS 12 can issue keys to hosts using a proposed generic protocol as shown at a high-level in FIG. 5. To ensure scalability, minimal server state is maintained by the KMS 12. The host is responsible for negotiating a secure session after retrieval of the session key. An important characteristic is that for hosts Alice and Bob communicating from separate sites 10, Alice's KMS 12 issues a session key to her; Alice then transmits key selection information to Bob so that he may retrieve the same session key from his own KMS 12. Because the quantum key pools are in sync during the QKD process, and the selection information is an index into the pool, the session key itself is never actually transmitted and thus cannot be eavesdropped. Within a single site 10, the KMS 12 can be hosted as a virtualized service on a rack or blade server to achieve scalability. The server should be physically secured so that there is no direct access to the quantum key pool. It is also possible to utilize a variant of this generic protocol where the local and remote KMSs 12, rather than the hosts, directly interact during key agreement. It can be appreciated that this variant can include direct KMS-to-KMS interactions or can occur through the QNL network from one KMS 12 to another KMS 12. For example, the KMS 12 of node 100 can interact with the QNL of node 100, which interacts with the QNL of node 101, which in turn interacts with the QNL of node 102, which interacts with the KMS 12 of node 102.

After the initial key grant to the originating host, Alice's KMS 12 directly transmits the key selection information to Bob's KMS 12 through the authenticated KMS peer-to-peer interface. Although this results in slightly greater complexity in the KMS implementation and requires limited state information on the session to be kept server-side, it reduces host-to-host communication, which can be costly especially in a wireless context. Furthermore, it allows both KMSs 12 to perform host authentication, and the remote KMS 12 can notify the remote host of the incoming session through an efficient push-based notification mechanism. The process of agreement of QKD-generated keys has also been integrated with standard security protocols such as TLS.

To summarize, the generic protocol for key negotiation between Alice on Site A and Bob on Site B in FIG. 5 is shown with a high-level representation of the actual message exchange. Alice requests a session key from the local KMS 12 at step 1 in order to begin secure communication with Bob. Alice's local KMS 12 enforces any relevant policies and grants a session key to Alice at step 2 with an optional expiry time, as well as, in this example, a signed packet containing key selection information. Alice then contacts Bob directly over the conventional network at step 3 and provides this packet so that Bob can refer his own KMS 12 to retrieve the same key at steps 4 and 5. This is possible because the key pools of both sites are synchronized with the same content. Alice and Bob can then begin secure communication with the same symmetric session key at step 7 after a remote session key confirmation at step 6. This key will be periodically refreshed by the hosts if necessary, through an exchange with the KMS 12 similar to the key grant scenario. The refresh requirements are specified by the KMS 12 during key grant.

The KMS 12 ensures continuous synchronization of its quantum key pool with that of the corresponding remote site for each site-to-site connection. The key pools are in sync so that the same quantum key material can be referenced and discovered during session key negotiation conducted by the sites' hosts. The KMSs 12 coordinate securely through a communications channel that is typically a conventional network, with an authenticated connection. Another possibility is to have each KMS 12 make a request into its respective underlying network layer, and all KMS coordination occurs through that layer.

The KMS Layer communicates with the Network Layer below to extract the quantum key material for storage in the quantum key pool. The KMS 12 also initializes and terminates the overall site-to-site connection process. The underlying network layer is normally assumed to perform QKD key generation, but if the performance of this process is deemed insufficient or is interrupted, then another cryptosystem can be utilized as a fallback mechanism if allowed by the security policy. The other crypto-system may be based on another quantum-safe, or a classical algorithm and protocol (whether quantum-safe or not), while its implementation maintains the same interface to the KMS layer.

QKD System with Pre-Allocation and Optimized Routing

Figure 1:
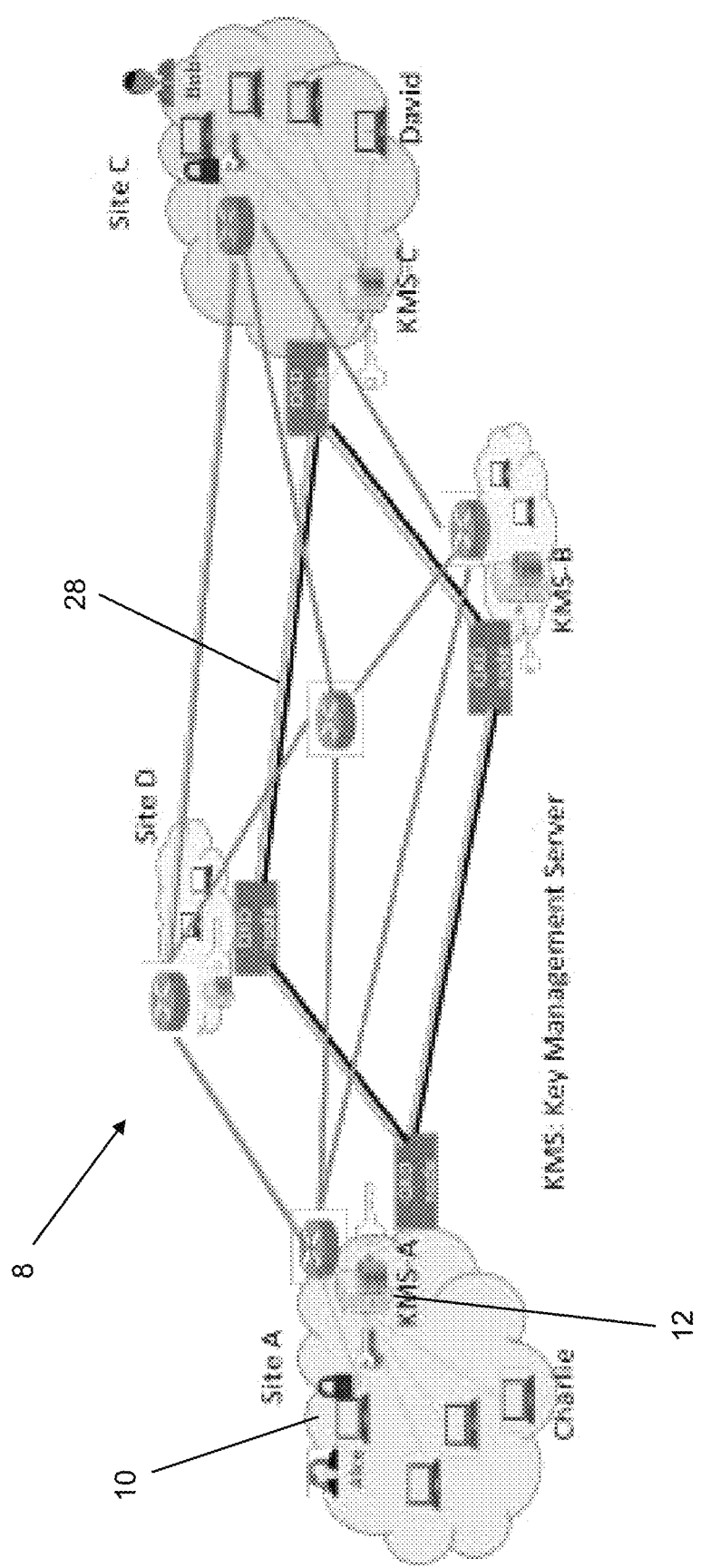
FIG. 1 is a schematic diagram of an example of a QKD network.

As discussed above, the presently described approach to a routing solution can take capacity and demand information and direct key relay operations in the QKD network 8. The routing solution can account for competing requests to efficiently transfer keys within the network, avoiding oversaturating links by considering multiple paths in advance. The routing solution can be built on a network architecture such as that described in Ref [1] and summarized in FIGS. 1, 4, and 5 as described above. The present system is connected with a set of QKD communication links 28 between pairs of QKD devices 24 (see also FIG. 6 described below).

Figure 6:
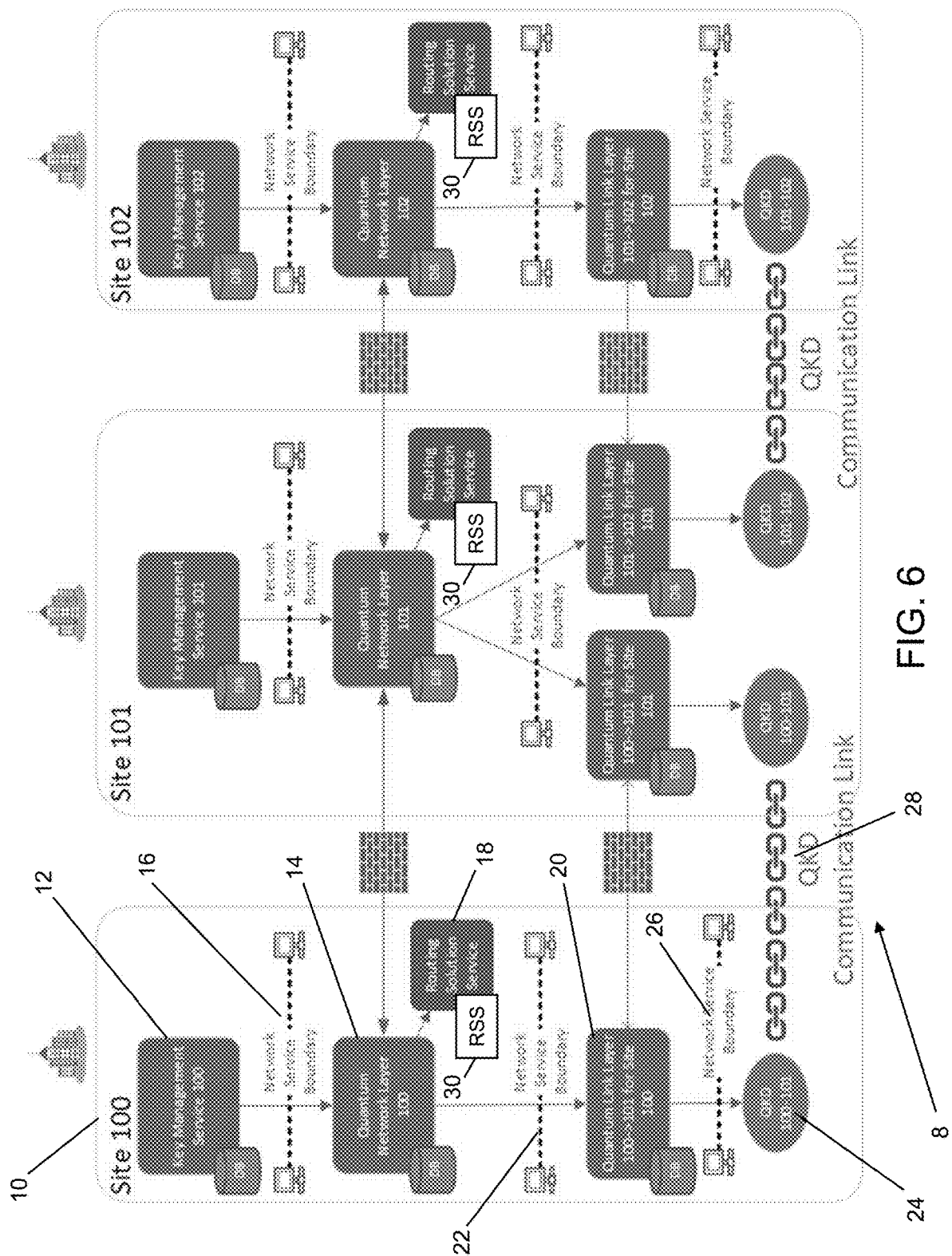
FIG. 6 is a schematic diagram of an example of a QKD network using a routing solution service to optimize the routing of QKD key material in a network through pre-allocation.

An example of a deployment of the system on a three-node network graph is shown in FIG. 6. It may be noted that in FIG. 6 reference numerals are used with respect to only one site 10 (Site 100) for clarity and ease of illustration and that like elements at other sites 10 (e.g., Site 101 and Site 102) may be referred to like numerals throughout this disclosure. Each site 10 includes a KMS 12 that is connected to a quantum network layer 14 via a network service boundary 16 within the site 10. The quantum network layer 14 is coupled to a routing solution service 18, which is used to determine and implement a routing solution as described below. The quantum network layer 14 is connected to a quantum link layer 20 via network service boundary 22 within the site 10. The quantum link layer 20 is connected to a QKD device 24 via network service boundary 26 within the site 10. In this example, Site 100 is connected to Site 101 via a QKD communication link 28 between QKD devices 24. It can be appreciated that pairwise QKD links 28 are provided between Site 100 and Site 101 and between Site 101 and Site 102, such that connectivity between Site 100 and Site 102 is via Site 101.

Figure 7:
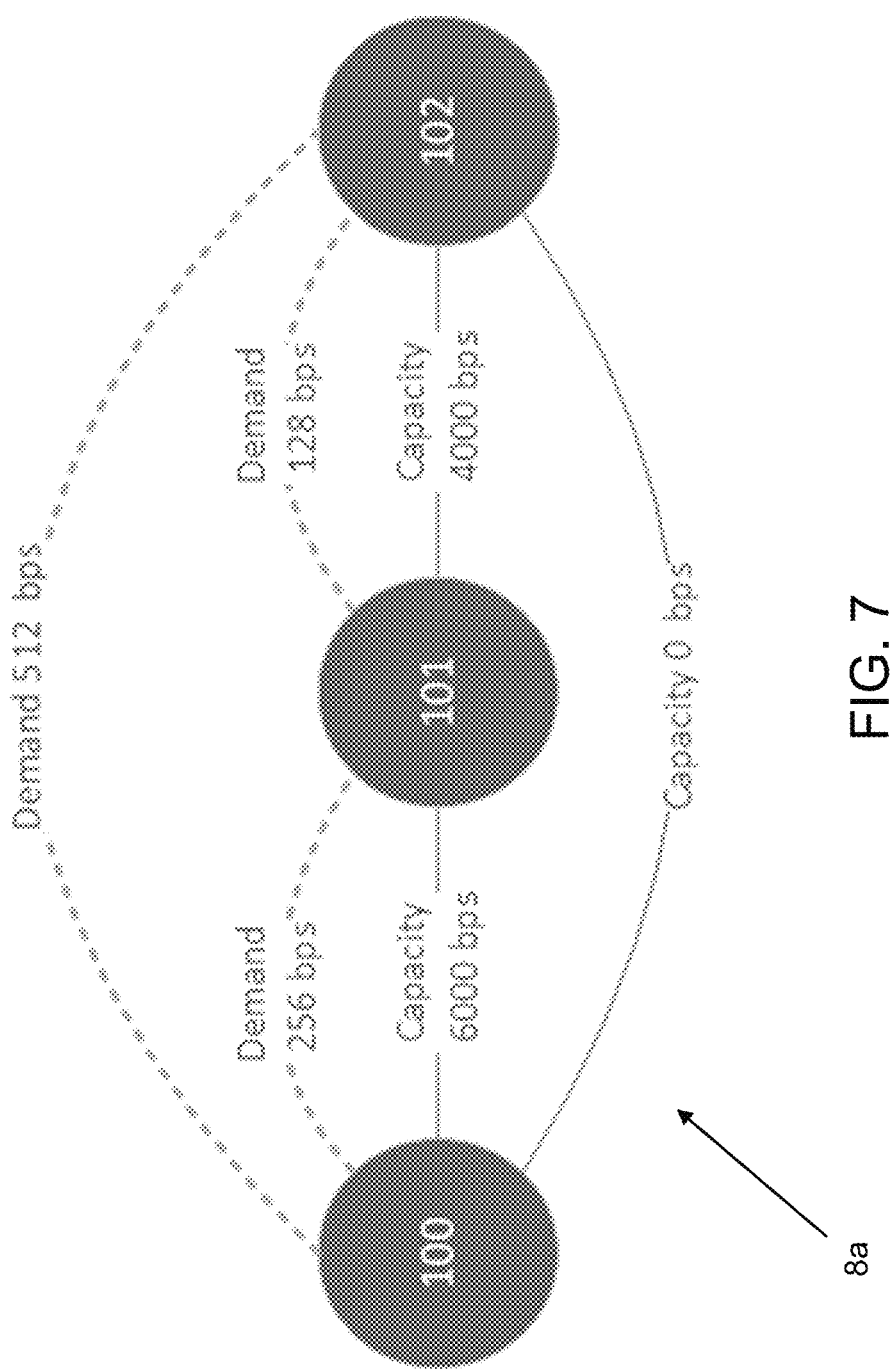
FIG. 7 is a network graph of an example of a network having three nodes.

A pair of nodes (representing a pair of sites 10) in a network graph can have a Capacity rate for the QKD generation rate between them—for example, 1000 bits per second. A pair of nodes 10 in a network graph can have an expected usage rate (Demand) between them—for example, 5000 bits per second. Referring now to FIG. 7, an example of a simple network graph 8a with specified network node pair link QKD generation rates (Capacity) and a set of network node pair link expected usage rates (Demand) is shown.

Figure 8:
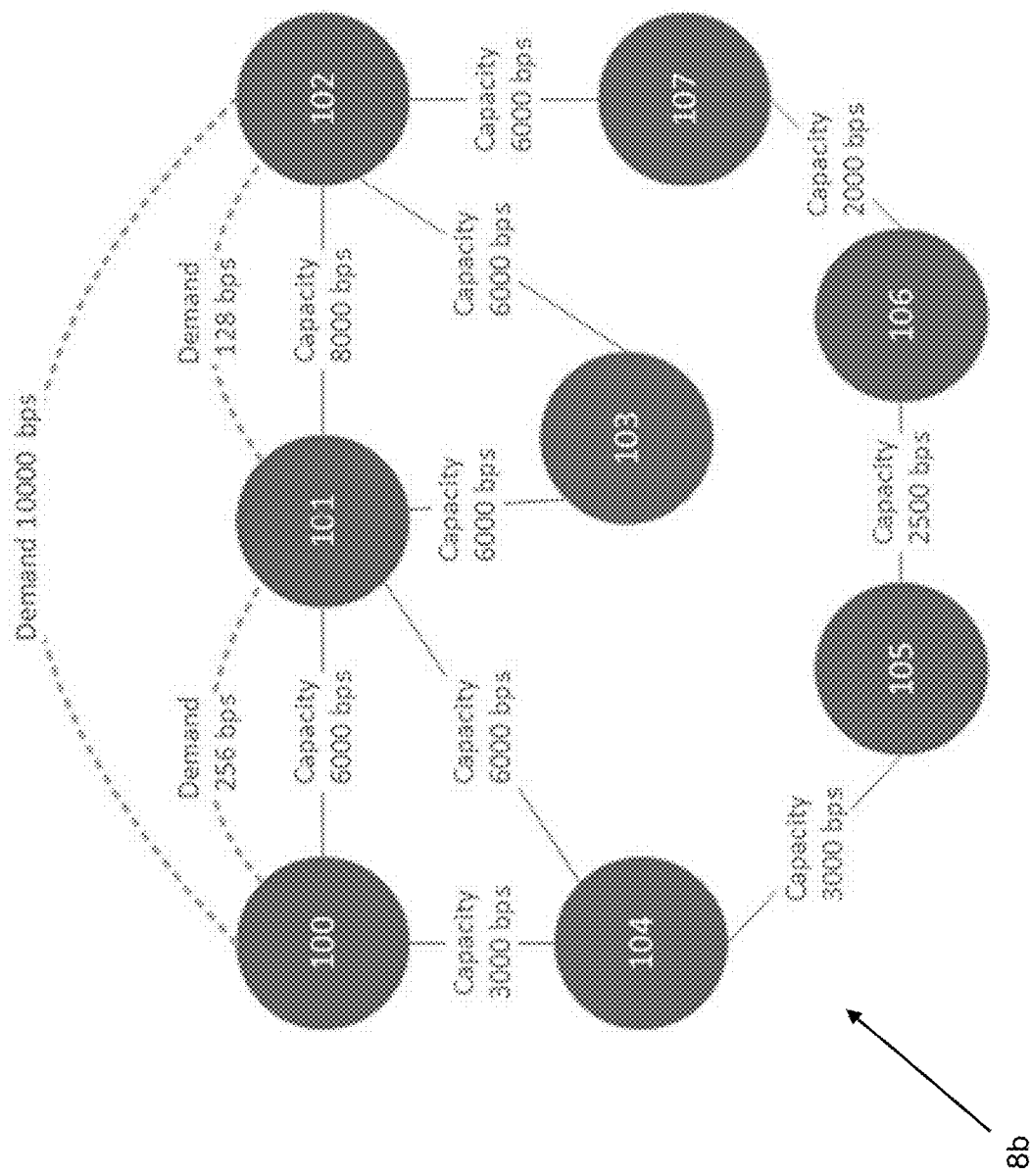
FIG. 8 is a network graph of an example of a non-trivial sized network.
Figure 9:
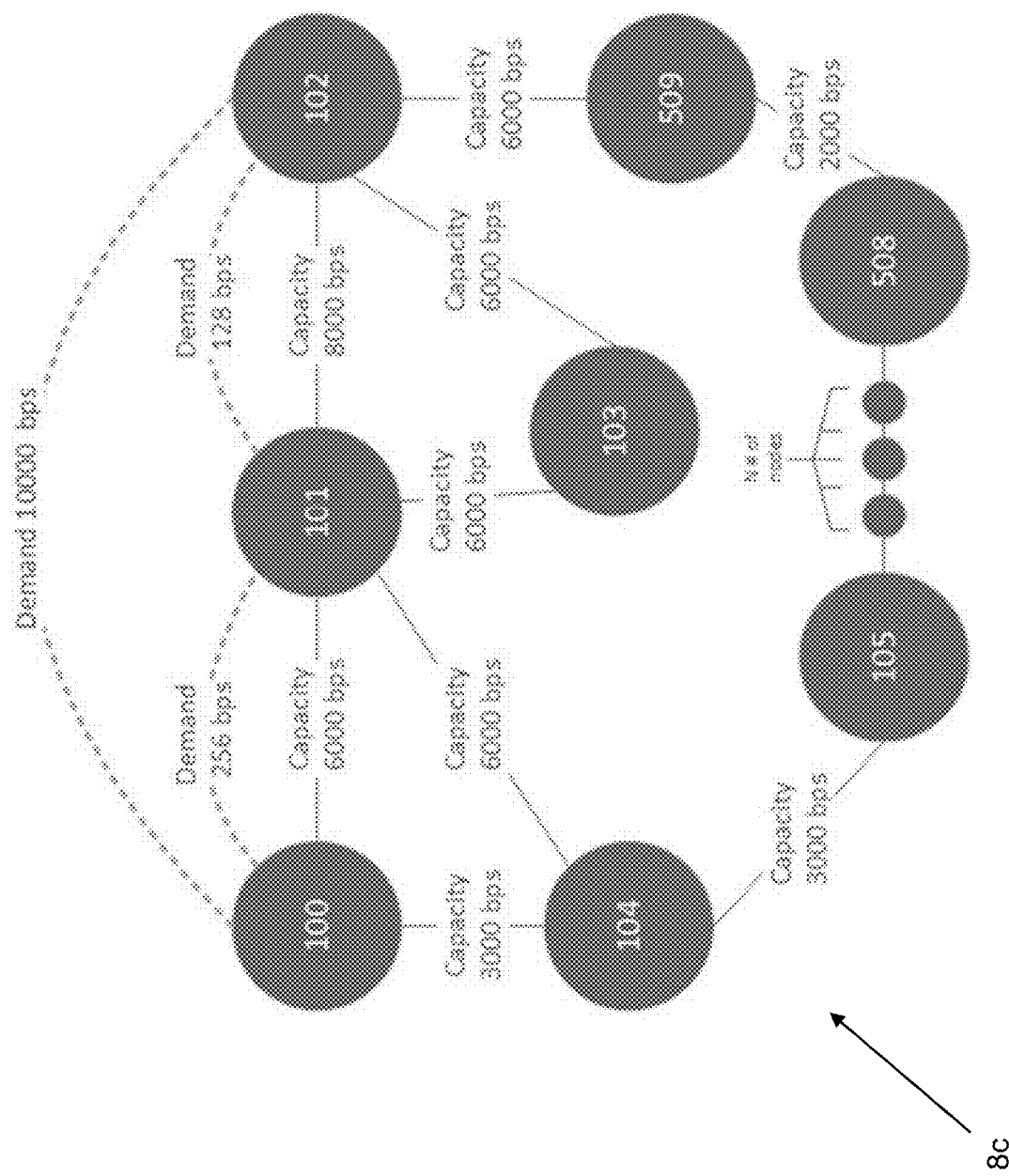
FIG. 9 is a network graph of an example of a large, generic sized network.

In FIG. 8, an example of a non-trivial size network graph 8b with specified network node pair link QKD generation rates (Capacity) and a set of network node pair link expected usage rates (Demand) is shown. It can be appreciated that in the graph 8b, the various paths available for connectivity between certain nodes becomes more complex, along with factoring in the Capacities and Demands on each edge. In FIG. 9, an example of a large, generic size network graph 8c with specified network node pair link QKD generation rates (Capacity) and a set of network node pair link expected usage rates (Demand) is shown.

Figure 3:
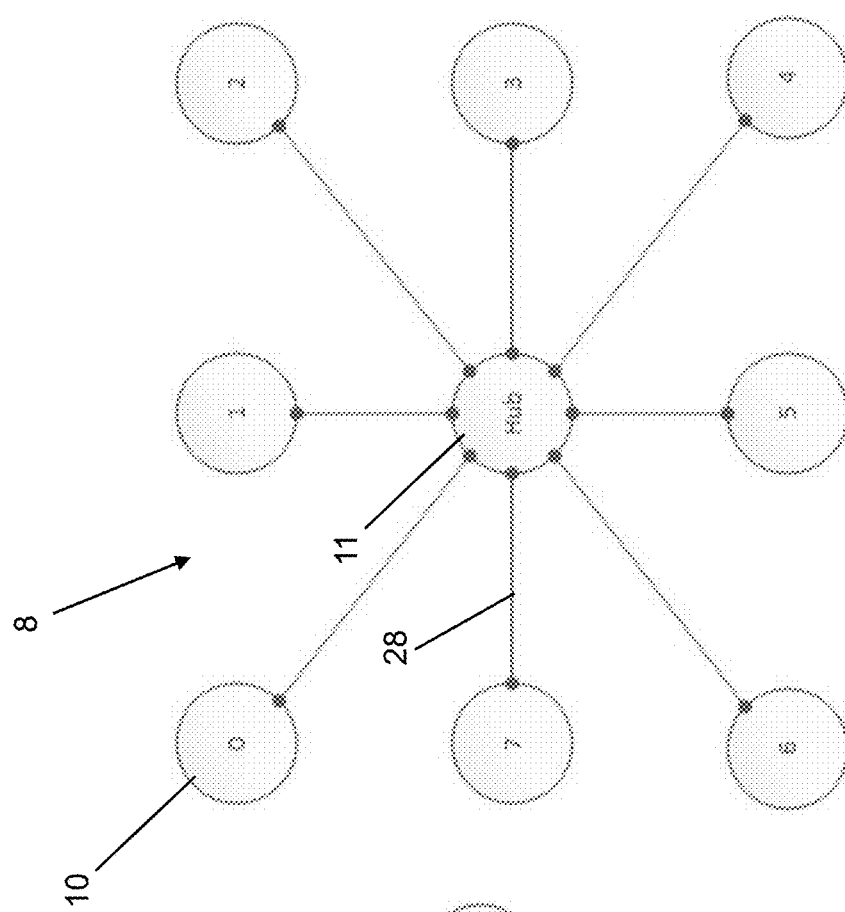
FIG. 3 is a graphical illustration of a series of QKD links through a hub site.
Figure 2:
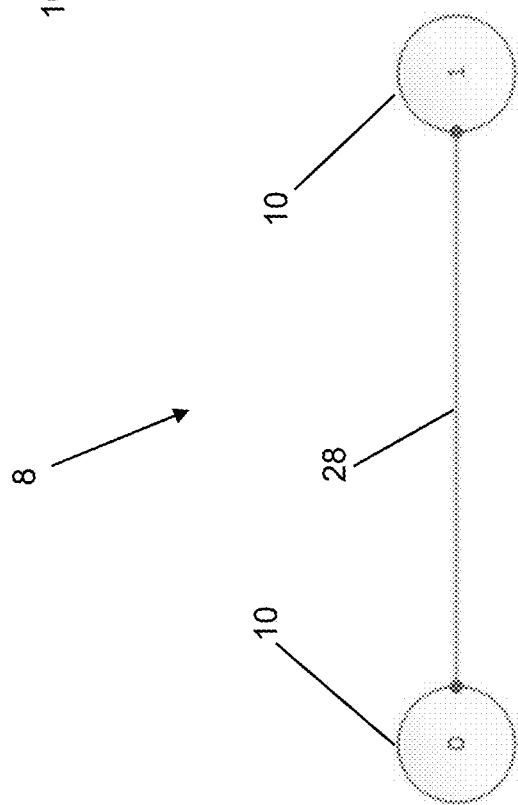
FIG. 2 is a graphical illustration of a pairwise QKD link.

As discussed earlier, and referring again to FIGS. 2-3, a QKD network 8 can be formed by connecting a set of these pairwise QKD links 28 into a larger graph. This network 8 can connect across a larger distance than any individual link 28 while allowing broader communication without requiring an individual connection per party. Through a process called 'key relay' or 'key swap', random shared secret material can be securely transferred through a QKD network 8 between non-adjacent nodes. Random shared secret material is processed into a key by dividing it into pieces of a specified length and assigning it a unique shared identifier. The key relay operation takes a key for an adjacent node pair and securely sends it to the non-adjacent node so they now share the same key. The secure transfer consumes QKD keys along the path to encrypt the key value being relayed.

At least some current implementations address key relay or key swaps between non-adjacent nodes "on-demand". A request for a key shared with a non-adjacent node triggers the key relay to establish a shared key between the node pair. An on-demand approach fails to account for competing requests in the network which can have unintended side effects. A naïve (but common) approach finds the shortest path between the nodes to perform a key relay. This ignores the QKD link capacity along that path, which could oversaturate a path or portion of it. A refinement might consider finding the maximum cost path by treating the capacity as weight for each edge QKD link 28. However, this can delay the chance a portion of the path becomes oversaturated and fails to take into account competing key relay requests that might consume capacity of one or more shared QKD links 28. A failure in key relay will consume keys used to encrypt the value being relayed before it reaches a link that has been oversaturated. The next path option is selected, and a key relay is performed but the result of this is unknown. Since the process is completely ad hoc there is no deterministic outcome. Overall, this is an inefficient approach to providing a QKD network 8.

It is recognized that a system wide approach looks at the entire QKD network 8 to route keys between nodes. Each QKD link 28 in the network 8 has a capacity that describes how many keys it can generate. Nodes in the network 8 in turn have a set of demands between node pairs representing keys required for communicating between those nodes. A routing solution (implemented by the routing solution service 18) can take this capacity and demand information and direct key relay operations in the QKD network 8. The routing solution can account for competing requests to efficiently transfer keys within the network, avoiding oversaturating links by considering multiple paths in advance. Keys are relayed based on forecast demand and not waiting for an actual request, reducing latency. This allows the QKD network 8 to operate in a continuous fashion, performing key relay operations at the direction of the routing solution based on capacity and demand.

The presently described implementation of a routing solution can treat the QKD network 8 as a multi-commodity flow problem, with each QKD link 28 having a capacity to generate shared secret material and a set of demands between node pairs representing the shared secret material required for communication between those nodes. In an implementation, this can be solved computationally using linear programming for a set of capacity and demand data for a network along with a desired precision. The precision helps bound the time required to compute a result. It can be appreciated that one can choose different potential parameters to be optimized. E.g., in an implementation, one can optimize the demand fraction (the percentage of each demand, for all the demands). It can also be appreciated that the optimization can be kept the same, but one can utilize, for example, different weights for the demands in order to facilitate the satisfaction of some demands over the others.

For example, to determine how to route keys in a QKD network 8 one can look at the key demands between network nodes against the key capacities of QKD link node pairs. As noted, one approach to solving this problem is to treat it as a linear programming multi-commodity flow problem. This allows the system to optimize key routing across the entire QKD network 8.

To implement this approach, the system can be configured to include a Routing Solution Solver (RSS) component 30 (e.g., as part of or accessible to the routing solution service 18 as shown in FIG. 6) that is responsible for solving the linear programming problem and updating the solution in real-time if capacities or demands change in the network. The RSS 30 can be centralized, although in the example shown in FIG. 6, the system distributes the RSS 30 to each node (site 10) in the QKD network 8. This prevents the component from becoming a central point of failure or attack, thus increasing the overall resilience of the network 8. The RSS 30 can be implemented as an embedded algorithm in the QNL process or can be an embedded algorithm in a separate service. The RSS 30 can be a single shared worldwide service or can be deployed "n" times, where "n" is, for example, the number of nodes in the network, a smaller number or, for considerations such as redundancy, reliability, or performance may be larger number than the number of nodes. The output from the RSS 30 is deterministic given identical inputs, so each node is able to generate the same result independently in any configuration that is used.

Figure 10:
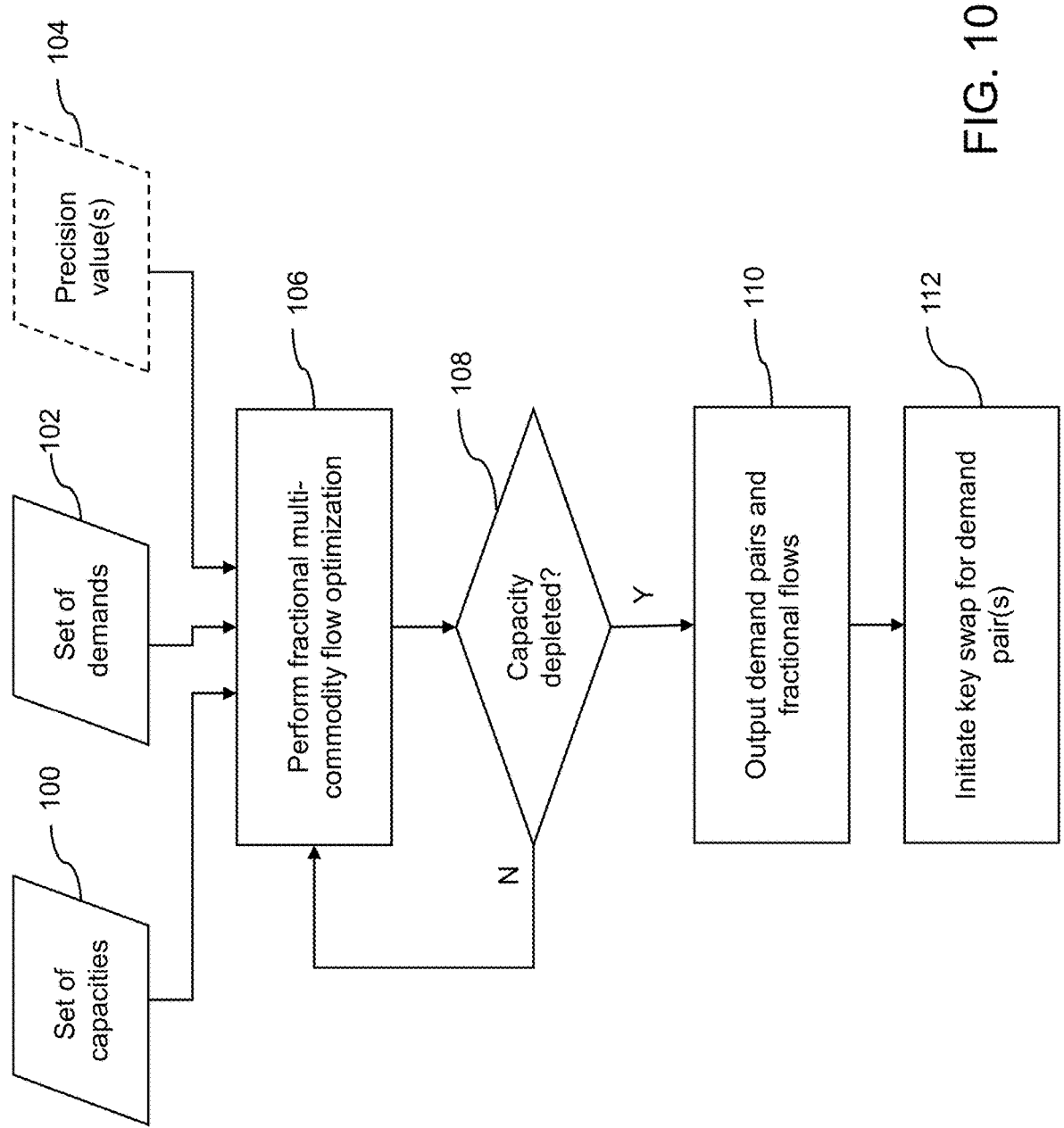
FIG. 10 is a flow chart illustrating computer executable instructions that can be executed in optimizing the routing of QKD material in a QKD network.

As illustrated in FIG. 10, the RSS 30 can receive a set of demands (D) 100 between nodes in the network 8, along with a set of capacities (C) 102 between QKD connected nodes 10 in the network 8, as inputs. The RSS 30 uses these inputs to solve, for example, a fractional multi-commodity flow problem, by optimizing the fraction of demand that can be achieved given the network capacity at step 106. A fractional approach to solving the problem is taken to reduce the complexity and ensure a solution that satisfies at least a fraction of demand is obtained in the event sufficient capacity is not available. The RSS 30 can iterate through the algorithm at step 108, until it is determined that capacity is depleted. At step 110, the RSS 30 outputs the demand pairs and fractional flows after any such iterations are completed. In addition to the capacity and demand sets 100, 102, a precision value or values 104 can be provided as another input to the RSS 30 to help determine how many iterations to perform and bound the time and computational effort used to obtain a solution (shown as an optional value using dashed lines in FIG. 10).

For example, assume that the set of capacities 100 is defined by a C matrix as follows:

$$\text{array}([[0., \quad 0.5234847, \quad 0.47514525],$$
$$[0.5234847, \quad 0., \quad 0.],$$
$$[0.47514525, \quad 0., \quad 0.]]),$$

and the set of demands 102 is given by the following D matrix:

$$\text{array}([[0., \quad 1., \quad 1.],$$
$$[1., \quad 0., \quad 1.],$$
$$[1, \quad 1., \quad 0.]]).$$

In this example, the RSS 30 returns at step 110, a set of fractional flows (demandNodePairRoutingSolutions—see FIG. 11), each one representing a demand pair (flowsSingleNodePair—see FIG. 11). A fractional flow is a list of paths and amounts for a demand pair (flowsSingleNodePair—see FIG. 11). This may include multiple paths for a demand pair to draw keys from other nodes to best satisfy the required demand. A node uses the fractional flows to perform key routing in the form of key swapping between network nodes.

To determine which node in a demand pair should initiate a key swap, a conventional election algorithm can be used to determine the direction, by ordering the identities assigned to each network node. Fractional flows can be rewritten so that each demand pair source→ destination is based on source identity<destination identity. Each node filters out the fractional flows where they appear as a source demand pair and uses this to direct key swap operations. Keys are allocated by the source node based on the total amount specified in a fractional flow (flowsSingleNodePair—see FIG. 11). A flow contains one or more paths and amounts representing the number of keys and nodes they should be routed through to maintain an optimal key allocation in the network. This prevents oversaturating a link within the network that might stall key swaps or waste keys.

The linear programming optimization returns a list of fractional flows at step 110 representing different paths and shared secret material amounts to relay. It may be noted that it is possible that demand may not be completely satisfied, but the optimization result returns a solution that fulfills the largest fraction of demand in the network 8. The result obtained is deterministic for the same inputs, allowing it to be computed centrally or in a distributed fashion by individual nodes 10 in the network 8. The paths returned in fractional flows prevent QKD link saturation by incorporating all key relay traffic as part of the solution generated. QKD link capacity is efficiently distributed across the QKD network 8 to best satisfy demand as a result of the optimization. Key swaps for the demand pair(s) can be initiated at step 112 to preemptively and proactively retrieve keys in an optimized manner such that nodes in the network are ready to begin communicating with minimal latency. The optimization can be used continuously thereafter to continuously perform key swaps in this way, until capacities and/or demands change, requiring a new optimization to be computed in real-time in order to ensure reduced latency on an ongoing basis.

Once shared keys have been established between a node pair, usage of those keys needs to be managed. A key relay process can be implemented to establish shared symmetric keys between network nodes 10. Since data communication is directional in nature, be it client-server, receiver-transmitter, etc.; keys should not be reused to preserve secrecy. For an ordered node pair, one should ensure that if one node uses a key in the forward direction that the other node does not try to use the same key in the reverse direction. A naïve approach would be to synchronize access to the keys shared by a node pair. However, synchronization would add latency into the system and would also consume keys to secure that communication. An enhancement of the routing solution described herein can define a ratio for each demand pair in the network 8. This ratio defines the forward and reverse direction key requirements of the total demand input to the routing solution. Keys relayed between demand pairs can then be divided according to this ratio, allowing an immediate response (when keys are available) to key requests without the overhead and latency of an added synchronization protocol.

Capacities and Demands are configured for every pair in the system (default values are zero). The first phase of the overall algorithm calculates a maximum concurrent flow solution with explicit flow amounts and network paths to use. The second phase of the algorithm converts the key material into a directed graph solution from an undirected graph solution. The algorithms can be deployed and run in one or more centralized instances or can be deployed in each site to be used exclusively by that site. As noted above, this can be run continuously using the optimized solution until a new solution needs to be computed.

Optimized Routing of QKD Key Material in the Network

An asynchronous background job on each site can be configured to run at specific time intervals (configurable) to apply the optimized solution within the network 8 in a continuous manner as discussed above. In this implementation, no centralized server is needed for controlling the orchestration. The job on each site filters the portions of the routing solution that are relevant to its node, that is, any demand pairs which include its node, and any routing solution flows that include its node in the path between the demand pair nodes.

Each node operates on this relevant sub set of the routing solution. Within a pair of demand nodes one of the nodes can be calculated to be the "key material provider" for all key swaps. In the present solution this can be determined by doing a string comparison of the node identities and the lesser value is the provider. Since this is a deterministic calculation it does not need any communication between the two nodes.

Each cycle of the job retrieves key material from QKD servers that are connected to its node and adjacent nodes based on the routing solution flow path's first path segment and the amount of key material. For example, in the large network diagram shown in FIG. 9, Site 100 would retrieve key material from a QKD server linked with Site 101 and Site 104.

By only retrieving key material based on this optimized routing solution, the key material on any given QKD link 8 is used at the expected rate relative to the routing solution for each job cycle (which matches the routing solution frequency of the solution being applied—e.g. 1 per second). The job can be configured to run at different intervals but the ratio of amounts for each flow path is maintained. For example, running the job once per minute will result in 60 times the amount of key material per path compared to the once per second routing solution cycle calculations. All key material retrieved from QKD sources can be persisted in a local database.

The nodes in the paths from the routing solution are commonly called "Trusted Nodes" as they are performing encryption, decryption, and authentication operations of data payloads between demand pair nodes. This is accomplished using shared secret key material generated on the QKD communication link 28 between each pair. To achieve information theoretic secure encryption, the data transmitted between a pair of Trusted Nodes can be XOR encrypted using key material from their paired QKD devices 24. It can be appreciated that other encryption methods can be used to achieve information theoretic secure encryption as well. In a separate asynchronous background job, an algorithm creates groups of keys that need to be shared between two nodes in the graph (a key swap) and calculates how many bits to send down each path in the routing solution. Factors that are used in the calculations, can include how many key bits to include (min/max), how many keys to include (min/max), and what category/classification of key material to include and in what quantities (e.g., external client accessible key material vs internal overhead key material).

A key swap group, also referred to herein as a key swap batch, can be persisted in the system along with its state machine, which reflects the synchronization with the recipient node in the demand pair. The recipient demand pair node persists all the same data as the key swap provider node and tracks its own state machine values as data is received at the receiving node. Once a key swap batch is created on each key swap providing node, an algorithm analyzes the database persisted key swap batches state machines, and compares it with the optimized routing solution to determine how to slice the key material (and keys) within the key swap batch (and its explicit list of paths between the demand pair using Trusted Nodes) into messages to each adjacent Trusted Node in the graph 8.

For example, Path 1: 100→101→102 and Path 2: 100→104→103→102 would result in one slice of the key material being sent to node 101 next and the remaining slice of key material being sent to node 104 next. This information gets persisted in the database. Each key swap batch sliced message includes the entire key swap batch meta data and an authentication value that can authenticated by the recipient. This can be a computational algorithm, e.g., a SHA-256 hash, or it can be a message authentication code algorithm like POLY1305. The system can use a combination of SHA-256 and POLY1305 (with One Time Pad (OTP) injected key material from QKD key material between node pairs).

In a separate asynchronous background job on every node in the system, an algorithm can be executed that combines one or more data messages destined for the same adjacent node recipient into one single message. Commonly referred to as piggy backing, this technique is uniquely implemented in the present system as it is signed with a message authentication code cipher called POLY1305. The POLY1305 codes can be seeded with OTP key bits from a QKD pair between the current node and the recipient adjacent Trusted Node. Each POLY1305 calculation, seeded with OTP bits, requires 256 bits. These QKD OTP key material bits are a scare resource and indiscriminately using 256 bits to sign data chunks can readily consume all QKD key material being generated leaving no key material left for actual non overhead use by end clients. This piggy backing applies for messages generated on this node as well as inbound messages received by this node that are intended for transit through to other nodes.

Key swap recipients handle one or more sliced messages containing some portion of the entire key swap. Using the meta data for a key swap batch (included in every sliced message to accommodate out of order delivery at the recipient), the recipient node can determine when all key material data has been received, authenticate the database persisted local copy of the key swap batch using the agreed upon end to end authentication algorithm, and the key swap provider included value (in the sliced messages meta data). If the values match, the recipient updates the database state to reflect the first authenticated state.

Key swap recipients will prepare and send an acknowledgement message (Key Swap Ack) to the key swap provider for this demand pair to indicate a successful receipt of all message slices containing the key material bits and a matching authentication value. Key swap ack message(s) are handled much like other messages between nodes in that they are grouped together for common recipients to amortize the included POLY1305 with seeded QKD OTP key bits used to calculate the authentication value of the message data payload. Key Swap Ack messages are end to end signed with POLY1305 OTP using keys only shared between the demand pair if they are sent through a Trusted Node path back to the key swap provider node. If key swap ack messages are sent directly to the demand pair key swap provider then a single POLY1305 OTP authentication value can be calculated for the message payload (which can include multiple sub messages, e.g., an array of key swap acks, synchronization meta data, etc.). The local database state is updated for these actions for each key swap.

Key swap demand pair providers receive key swap ack messages and send a confirmation acknowledgement message (Key Swap Confirm Ack) to the key swap recipient for this demand pair to indicate a successful receipt and authentication of a key swap ack message. This applies for each key swap ack received. Key Swap Confirm Ack message(s)

are handled much like other messages between nodes in that they are grouped together for common recipients to amortize the included POLY1305 with seeded QKD OTP key bits used to calculate the authentication value of the message data payload.

Key Swap Confirm Ack messages can be individually end to end signed with POLY1305 OTP using keys only shared between the demand pair if they are sent through a Trusted Node path back to the key swap provider node. If Key Swap Confirm Ack messages are sent directly to the demand pair key swap recipient then a single POLY1305 OTP authentication value can be calculated for the message payload (which can include multiple sub messages, e.g., an array of key swap confirm acks, synchronization meta data, etc.). Once a message containing a Key Swap Confirm Ack message has been transmitted out of the node the state of the key material for these key swap batch(es) is in a state ready to be used for the demand pair. The local database state is updated for these actions for each key swap.

Figure 12:
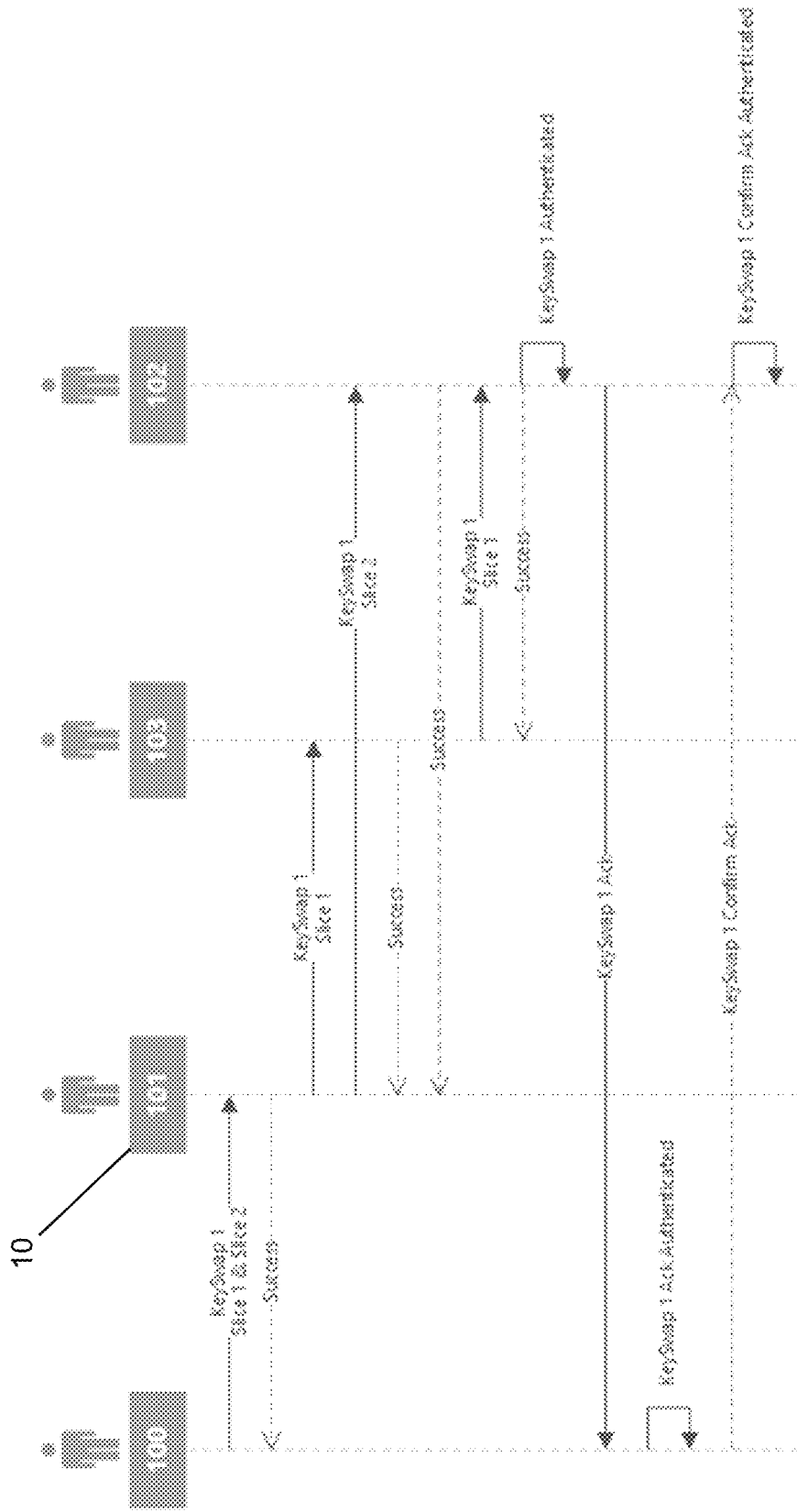
FIG. 12 is a sequence diagram illustrating an example of a key swap routine.

Key swap demand pair recipients will receive Key Swap Confirm Ack message(s) and validate the authentication of a Key Swap Confirm Ack message(s). This applies for each Key Swap Confirm Ack received. Once a message containing a Key Swap Confirm Ack has been authenticated the state of the key material for these Key Swap Batch(es) is in a state ready to be used for the demand pair. The local database state is updated for these actions for each key Swap. FIG. 12 provides one of the possible ways of performing a successful key swap between demand pair (100, 102). The process illustrated in FIG. 12 uses a combination of Trusted Node message routing and direct node message delivery. The process includes different authentication ciphers: SHA-256 and POLY1305 with seeding QKD OTP key material in this example and combines asynchronous and synchronous messaging.

Proactively Buffering QKD Keys

QKD devices 24 are currently known to have a limited amount of storage space. This may range from large traditional servers hosting a QKD link 28 to relatively small storage capacity satellite-based QKD link 28. As QKD keys are retrieved through real time use or as part of an optimized key swap solution (e.g., as described above), there are found, almost always, to be one or more QKD links 28 that have unretrieved keys over some period of time. For example, link 100→101 shown in FIG. 9 might have a surplus of 512 bps.

With these limited storage capacities, the QKD devices 24 need to decide what to do when storage limits are reached. Some QKD devices 24 may remove old keys to make room for new keys, some may stop generating new keys, some may have more complex solutions. In whatever way this issue is traditionally handled by QKD devices 24, results in a loss of total key bits being usable by external clients.

This problem is further compounded by the fact that one side of the QKD pair may have given keys to a requesting client but the matching key retrieval by the other client for the other part of the QKD pair may not request that key for retrieval for a period of time. That delta in key retrieval times may impact availability for key retrieval by the second client on the other QKD device 24, or it may impact key storage limits and space management algorithms in different ways on the two QKD device pairs (i.e., QKD devices 24 connected via a QKD link 28). This can lead to different behaviors between the two QKD devices 24 in a pair, which can make for complex solutions involving clients (i.e., the servers) trying to use this QKD device pair.

To address these problems, the system described herein can adopt a solution that actively monitors key generation rates and retrieves keys on both sides of the QKD link 28, to buffer them locally in the system, for future use. In one example, the system can proactively buffer excess keys, e.g., keys that are generated but may never get used. However, it can be appreciated that this proactive buffering can be applied in any scenario where keys are not being pulled out of the QKD device 24 before it is filling up. For example, there may be no actual demands our usage against a particular QKD device 24 for a time interval, which may occur for reasons including, but not limited to network outages, system being paused, routing solution requiring a long time to optimize the routing of key swaps, etc. When the system then comes back alive, these buffered QKD keys can be used to allow the system to run at higher bit rates than what the QKD capacity links are running at, since key material that would have been discarded or otherwise underutilized has been buffered for a more efficient and optimal usage.

Figure 13:
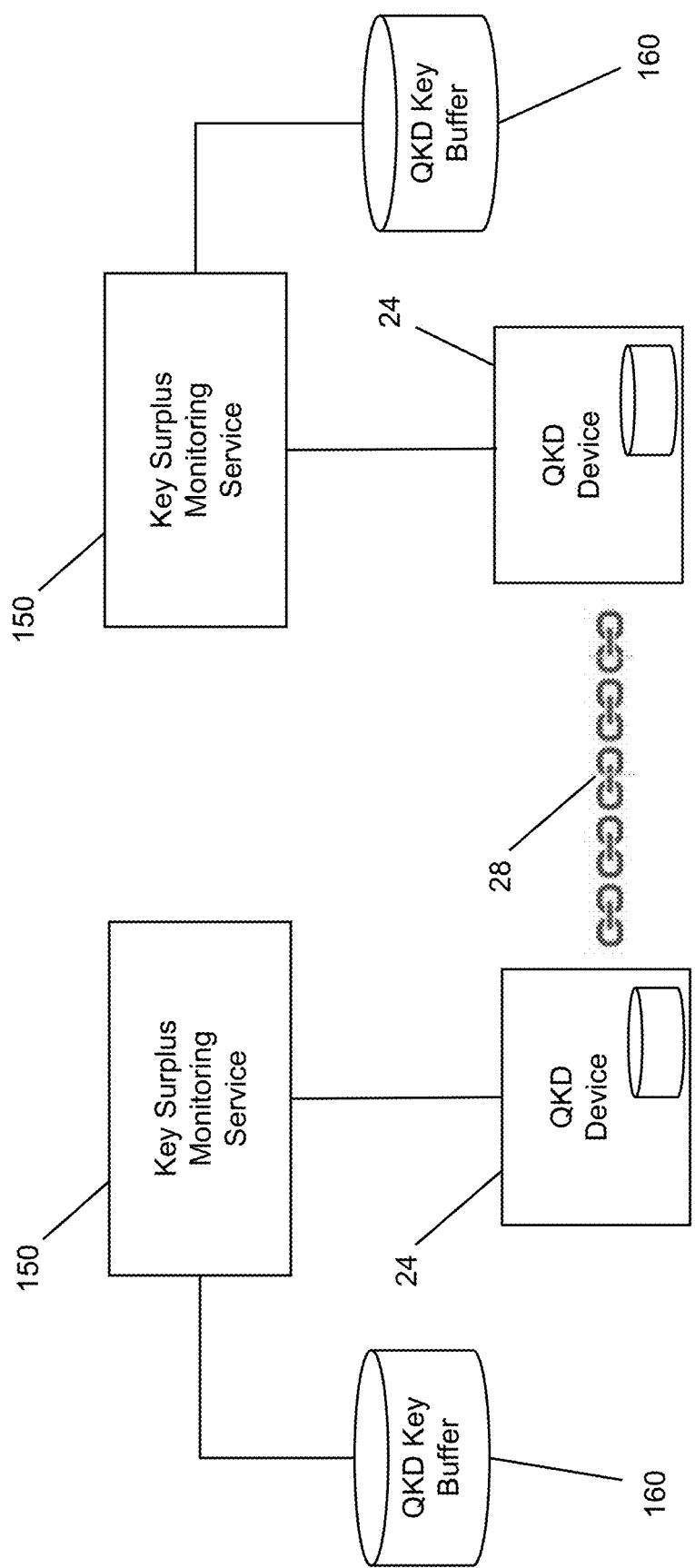
FIG. 13 is a schematic diagram of a QKD key material buffering solution.

An example of a configuration is shown in FIG. 13 in which a key surplus monitoring service 150 monitors the keys on both sides of a QKD device pair and obtains keys from the QKD devices 24 and stores the proactively obtained key material in a respective QKD key buffer 160. It can be appreciated that the key surplus monitoring service 150 can instead be provided as a centralized service rather than a distributed service as shown in FIG. 13. The QKD key buffer 160 can be implemented using an existing database such as the QNL database or can be provided using a separate hardware security module (HSM) or other off-the-shelf secure storage solution. Co-ordinating and synchronizing is required between the two servers that are communicating with these two QKD paired devices 24 (e.g., the QNL via the QLL). This applies to all QKD pairs in the system 8.

Fixed Retrieval Rates for Excess Keys

Using the configured capacity (C) for each QKD link 28, the system can compare the capacity with the routing solution and take the delta of the number of keys (or bits) that are left after the routing solution key retrieval is done in each cycle. This does not account for any variances in actual capacity versus the configured capacity and may over retrieve or under retrieve on any given cycle.

Dynamic Query of Available Keys

Using the standards specification of ETSI GS QKD 014, allows for a client to query the QKD device 24 for the quantity of key material available for retrieval via an API. Vendors may have other implemented APIs to provide this information as well. With such APIs, there are three API endpoints, namely one to get keys for the first time, one to get keys with specific IDs (done by the second client using a QKD pair), and a "status" endpoint that has a few data metrics, such as stored key count (number of keys available) and max key count (maximum number of the stored key count). Using the ETSI GS QKD 014 "get status" API endpoint, the client can poll the QKD device 24 to determine how many keys are available to retrieve as well as the maximum number of keys it can store. These two values can be compared with the needs of the optimized routing solution that will occur at the next cycle of the key swap algorithm described above. Whatever the method used, the number of keys (or bits) that are available for retrieval can be compared with what has already been retrieved in a cycle and the remaining keys can be retrieved.

Monitoring and Estimation of Actual Capacity Rates and Available Keys

In the absence of a suitable API that would yield this specific amount of available key material, this number can be estimated using real time monitoring and key retrieval attempts.

QKD vendors may provide monitoring data which can be used to calculate an estimated number of keys that are available (e.g., are or will be in excess and thus not utilized and/or be discarded). For example, a QKD vendor may expose an SNMP interface that includes the capacity rate, keys (or bits) available, average capacity over a time interval, etc.

If there is no exposed data to facilitate these calculations, then a polling solution that tests and reports will be used. Attempts to retrieve a specific number of keys are made at time intervals and the success or failure of those attempts can be used to estimate the actual key generation rate and the excess key rate. For example, if the algorithm polls every second and requests 1000 key bits but fails 10% of the time on average, then the actual capacity rate (average) is 1000*90%=900 bits/second.

Figure 14:
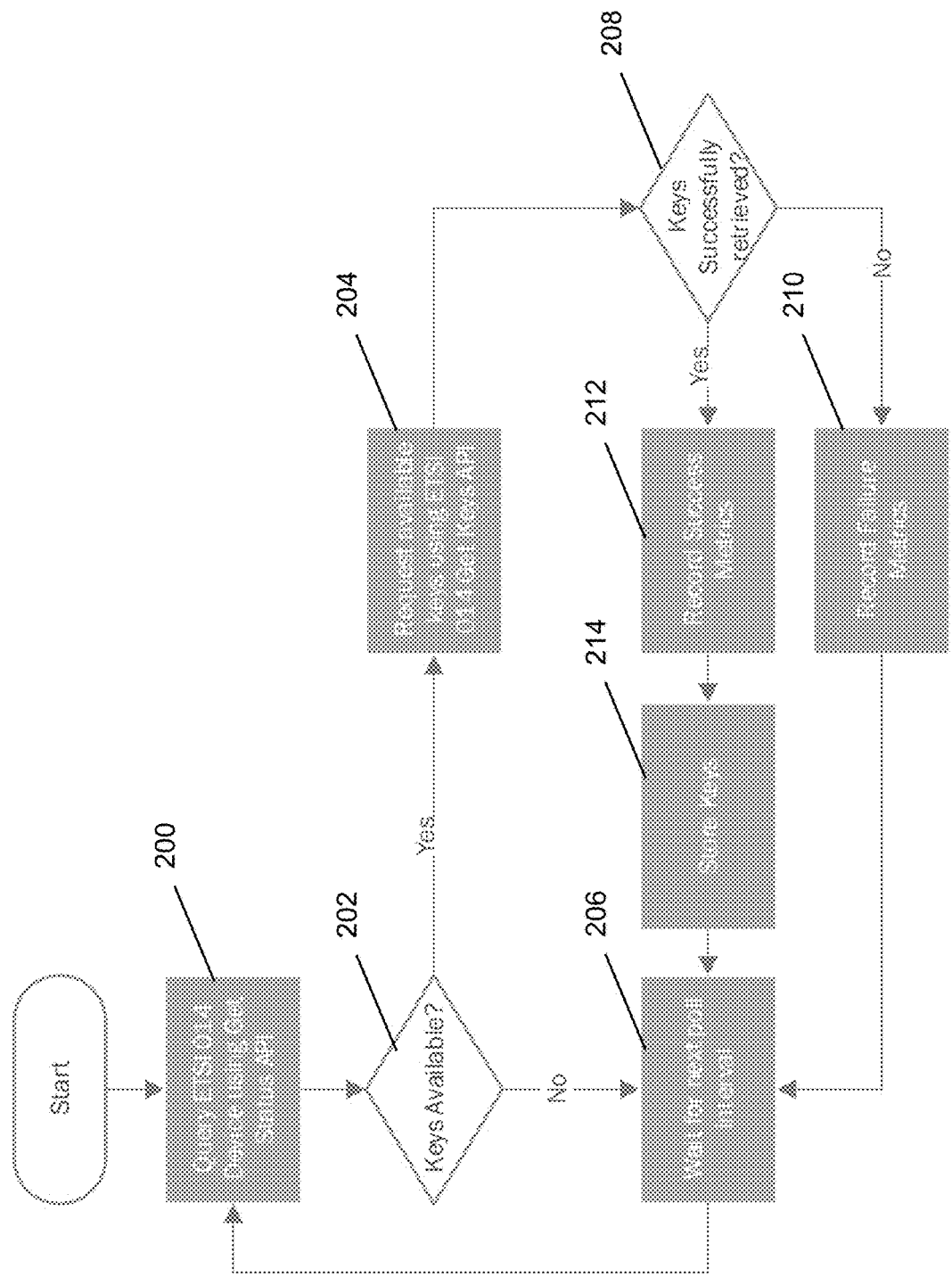
FIG. 14 is a flow chart illustrating computer executable instructions that can be executed in monitoring QKD capacity rates via an ETSI GS QKD 014 application programming interface (API).
Figure 15:
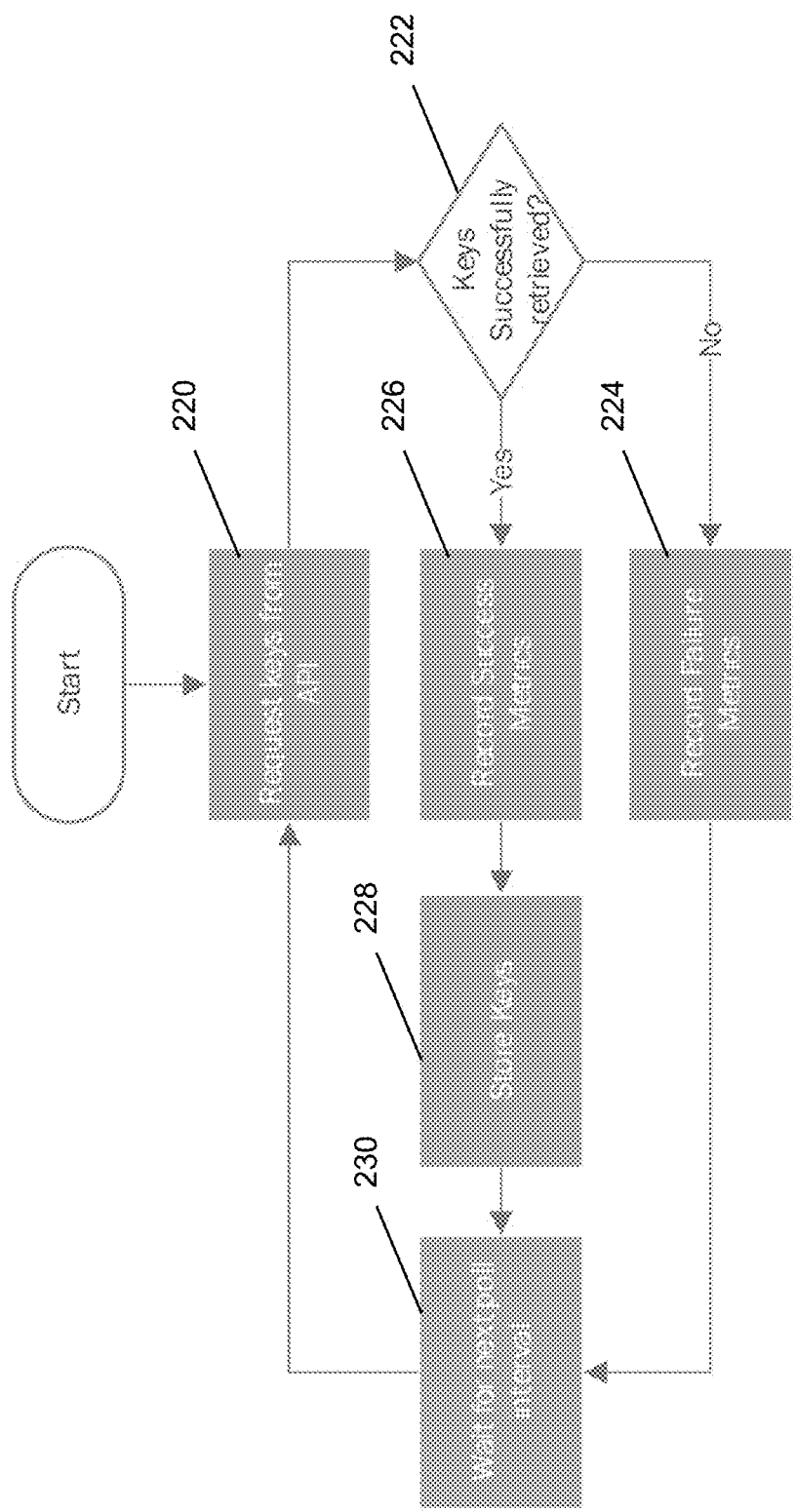
FIG. 15 is a flow chart illustrating computer executable instructions that can be executed in monitoring QKD capacity rates without an ETSI GS QKD 014 API.

Turning now to FIGS. 14 and 15, QKD capacity rate monitoring routines are shown for determining available keys in a QKD device 24. In FIG. 14, the routine is adapted for use with the ETSI GS QKD 014 API. In this example, the client queries the ETSI 014 device using the "get status" API at step 200 to determine at step 202 if any keys are available. If so, the available keys are requested by the client at step 204 using the ETSI 014 "get keys" API. If there are no keys available, the client waits for the next poll interval at step 206. When keys are requested, the client determines at step 208 if the keys are successfully retrieved. If not, failure metrics are recorded at step 210. If the keys are successfully retrieved, the client can record success metrics at step 212 and store the keys in the key buffer 160 at step 214 before waiting for the next poll interval. FIG. 15 illustrates a routine for a QKD device 24 that does not utilize the ETSI GS QKD 014 interface or APIs. At step 220 the client requests keys from the API configured to communicate with the QKD device 24 and, at step 222, determined if keys have been successfully retrieved. If not, failure metrics can be recorded at step 224. If keys have been retrieved successfully, success metrics can be recorded at step 226 and the keys stored at step 228 before waiting for the next poll interval.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the KMS 12, quantum network layer 14, routing solution service 18, quantum link layer 20, or QKD device 24, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of proactively performing key swaps among nodes in a quantum key distribution (QKD) network, the method comprising:
    determining a routing solution for nodes in the QKD network;
    making the routing solution available to the nodes in the QKD network; and
    initiating key swaps among the nodes in the QKD network, to transfer shared secret material through the QKD network between non-adjacent nodes according to the routing solution, prior to key requests being made within the QKD network.

2. The method of claim 1, further comprising:
    continuously performing key swaps among the nodes in the QKD network according to the routing solution;
    detecting a change in capacity and/or a change in demand on one or more links within the QKD network;
    determining a new routing solution based on the detected change; and
    continuously preforming subsequent key swaps according to the new routing solution.

3. The method of claim 2, further comprising periodically checking for changes in capacity and/or changes in demand to trigger determining the new routing solution.

4. The method of claim 1, wherein determining the routing solution comprises:
    obtaining a capacity and a demand for each link between nodes in the QKD network; and using the capacities and demands to determine flows for demand pairs of nodes in the QKD network and generate the routing solution, wherein each flow comprises one or more paths along with an amount of key material to transfer over each path.

5. The method of claim 4, wherein the flows comprise fractional flows.

6. The method of claim 5, wherein the fractional flows are optimized by solving a fractional multi-commodity flow problem by applying a linear programming optimization to determine fractions of the demand that can be achieved given the network capacity.

7. The method of claim 1, further comprising the routing solution is sent to each node in the QKD network.

8. The method of claim 1, wherein the routing solution is provided by a central service.

9. The method of claim 1, wherein the key swaps are initiated using an election algorithm to determine a direction for the key swap within each demand pair.

10. The method of claim 1, further comprising iterating an optimization of the routing solution with subsets of the QKD network until capacity is depleted to a predetermined amount.

11. The method of claim 1, further comprising defining a ratio for each demand pair in the QKD network defining the forward and reverse direction key requirements of the total demand input to the routing solution.

12. The method of claim 11, wherein keys relayed between demand pairs are divided according to the ratio.

13. A non-transitory computer readable medium comprising computer executable instructions for proactively performing key swaps among nodes in a quantum key distribution (QKD) network, comprising instructions for:
    determining a routing solution for nodes in the QKD network;
    making the routing solution available to the nodes in the QKD network; and
    initiating key swaps among the nodes in the QKD network, to transfer shared secret material through the QKD network between non-adjacent nodes according to the routing solution, prior to key requests being made within the QKD network.

14. A system for proactively performing key swaps among nodes in a quantum key distribution (QKD) network, the system comprising a processor and memory, the memory storing computer executable instructions that when executed by the process cause the system to:
    determine a routing solution for nodes in the QKD network;
    make the routing solution available to the nodes in the QKD network; and
    initiate key swaps among the nodes in the QKD network, to transfer shared secret material through the QKD network between non-adjacent nodes according to the routing solution, prior to key requests being made within the QKD network.

15. The system of claim 14, wherein the computer executable instructions further cause the processor to:
    continuously perform key swaps among the nodes in the QKD network according to the routing solution;
    detect a change in capacity and/or a change in demand on one or more links within the QKD network;
    determine a new routing solution based on the detected change; and
    continuously preform subsequent key swaps according to the new routing solution.

16. The system of claim 15, wherein the computer executable instructions further cause the processor to periodically check for changes in capacity and/or changes in demand to trigger determining the new routing solution.

17. The system of claim 14, wherein determining the routing solution comprises:
    obtaining a capacity and a demand for each link between nodes in the QKD network; and
    using the capacities and demands to determine flows for demand pairs of nodes in the QKD network and generate the routing solution, wherein each flow comprises one or more paths along with an amount of key material to transfer over each path.

18. The system of claim 17, wherein the flows comprise fractional flows.

19. The system of claim 18, wherein the fractional flows are optimized by solving a fractional multi-commodity flow problem by applying a linear programming optimization to determine fractions of the demand that can be achieved given the network capacity.

20. The system of claim 14, wherein the computer executable instructions further cause the processor to send the routing solution to each node in the QKD network.

21. The system of claim 14, wherein the routing solution is provided by a central service.

22. The system of claim 14, wherein the key swaps are initiated using an election algorithm to determine a direction for the key swap within each demand pair.

23. The system of claim 14, wherein the computer executable instructions further cause the processor to iterate an optimization of the routing solution with subsets of the QKD network until capacity is depleted to a predetermined amount.

24. The system of claim 14, wherein the computer executable instructions further cause the processor to define a ratio for each demand pair in the QKD network defining the forward and reverse direction key requirements of the total demand input to the routing solution.

25. The system of claim 24, wherein keys relayed between demand pairs are divided according to the ratio.

* * * * *